Aug. 12, 1958  V. WEBER  2,846,883
THERMOSTAT ADJUSTING DEVICES
Filed Nov. 24, 1954  2 Sheets-Sheet 1

INVENTOR.
Victor Weber
BY
HIS ATTORNEY.

United States Patent Office 2,846,883
Patented Aug. 12, 1958

2,846,883

THERMOSTAT ADJUSTING DEVICES

Victor Weber, Greensburg, Pa., assignor to Robertshaw-Fulton Controls Company, Greensburg, Pa., a corporation of Delaware Application November 24, 1954, Serial No. 471,069

4 Claims. (Cl. 73—362.4)

This invention relates to thermostatic control devices and more particularly to means for adjusting such devices to operate at desired condition values.

Thermostatic control devices of this general character are generally capable of a certain limited amount of adjustment by which an operator may calibrate the associated parts of the thermostat in relation to a correct temperature reading, so that proper operation is effective at that precise temperature. To achieve this aim, thermostatic devices have included screw means having a shank projecting into the interior of the thermostat housing and abutting the thermostatic actuating device thereby offsetting its position somewhat with respect to the normal temperature setting knob and its related shaft.

Usually devices of this type are somewhat inadequate since the accuracy of the adjustment is dependent entirely on the skill of the operator who performs this "trial and error" method. In addition to this "hit or miss" procedure, another difficulty found in this type of adjustment has been the inaccessibility of the adjusting means. The adjusting screw may be located within the thermostat housing itself and calibration requires a careful removal of the housing, if it is readily removable, and a careful probing with a screw driver or other suitable tool to effect rotation of the adjusting means. This procedure must be repeated until a proper calibration has been attained and, in the ensuing steps in this procedure, the housing and the thermostatic parts may become damaged or misshapen and therefore useless.

A thermostat adjusting means pursuant to the present invention is readily accessible to any one, requiring only the removal of the normal temperature setting knob or dial. The invention comprises means for altering the position of the temperature setting shaft relative to the thermostat for any temperature setting of the shaft and includes a serrated plate driving means having uniformly spaced calibration teeth or marks. For temperature adjustments the teeth or marks can be moved with respect to a stationary reference mark. The spacing between the teeth corresponds to definite increments or decrements of temperature depending upon the direction of rotation of the serrated plate. The temperature responsive means may be used to drive any form of temperature control means and in the present invention, for illustrative purposes only, is used to impart a force to a snap action electric switch control means for actuating an electric heater or a fuel flow means for heating purposes.

An object of the invention is to insure proper calibration of a thermostat using conventional parts and inexpensive means for effecting the same.

Another object of the invention is to increase the sensitivity of the calibration means to which the thermostat control means will respond.

Another object of the invention is to accomplish accurate calibration using a minimum number of simple parts which reduce the cost of manufacture, installation and replacement.

Other objects and advantages will appear from the following specification taken in connection with the accompanying drawing wherein.

Figure 1:
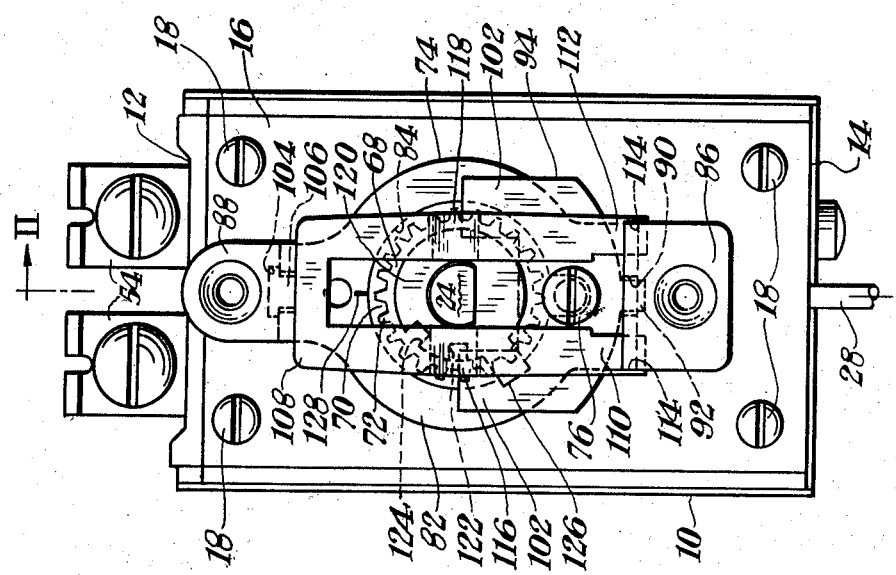
Fig. 1 is a front elevation of the thermostat control device and the calibration means.
Figure 2:
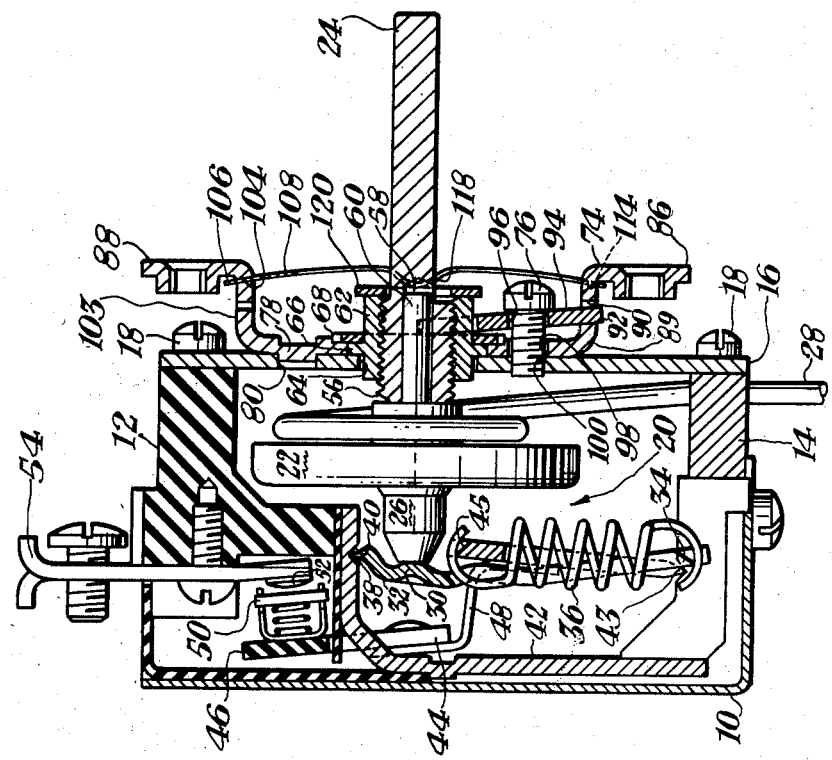
Fig. 2 is a section taken on the line II—II of Fig. 1.

Referring more particularly to the drawing, the thermostat of this invention is housed in a casing 10 provided with integral thickened top and bottom portions 12, 14 for attaching a cover plate 16 by means of screws 18. The thermostat, generally indicated by the reference numeral 20, is of the conventional snap action type and comprises an expansible and contractible diaphragm element 22 operatively engaged on one side by the interior end of a temperature setting shaft 24 and having an operating button 26 projecting from the opposite side thereof. The interior of the diaphragm 22 is in communication with a capillary tube 28 which extends exteriorly of the casing 10 for communication with the usual bulb element (not shown) located in the appliance to be regulated. As is well known, the temperature responsive means comprising the diaphragm element 22, capillary tube 28 and its associated bulb contains a fluid which expands upon the bulb being heated and serves to actuate the diaphragm element 22 sufficiently to operate the parts now to be described.

The button 26 abuts a protrusion 30 formed in the face of an actuating lever 32 of the snap action means. The actuating lever 32 is provided at one end with a knife edge seat 34 around which one end of a coil spring 36 is hooked, and at the other end with a knife edge 38 which fits in a notch 40 formed in a supporting structure 42.

A main control lever 44 is provided at the medial portion thereof with a knife edge seat 45 around which the opposite end of the coil spring 36 is hooked, and the lower leg 48 of the lever 44 is formed with a knife edge 43 which seats in a suitable notch in the structure 42. The upper leg 46 of the control lever 44 is insulated from the lower leg 48 and carries a conductor bar or bridge 50 for cooperation with a pair of fixed contacts 52 (only one of which is shown in the drawing). The contacts 52 carry electrical terminal connections 54 for line wires (not shown) which complete a circuit to a heater means (not shown) to be controlled by the thermostat.

When the diaphragm 22 expands to the predetermined temperature set by the shaft 24, an adjusting screw 56, made integral therewith, will engage and force the actuating lever 32 to the left, causing the control lever 44 to snap to the left, carrying with it the bar 50. Consequently, the circuit to a heating means (not shown) is broken since the contacts 52 are no longer bridged and the circuit will remain broken until the diaphragm 22 again contracts to allow the actuating lever 32 to move to the right. Such mechanism and operation is old in the art and forms no part of the present invention.

A novel arrangement of a calibration means for adjusting the relative positions of the diaphragm element 22 with respect to a bushing carrying the temperature setting shaft 24 will now be described.

The temperature setting shaft 24 is D-shaped in cross-section providing alignment and engagement details for receiving the usual control knob or dial. At the diaphragm end of the shaft 24, the male threaded adjusting screw 56, as previously mentioned, is made integral therewith and is centrally bored at 58 to receive the centering pin 60 secured to one side of the diaphragm element 22. The adjusting screw 56 mates with an internally threaded bushing 62 which is inserted through an aperture 64 in the cover plate 16. A circular flange 66 is made integral with the bushing 62 and is adapted to abut the exterior surface of the cover plate 16. Secured to the flange 66 as by welding or any other suitable means is a serrated plate 68 having a plurality of uniformly spaced notches 70 and teeth 72, the purpose of which will be described hereinafter.

Surrounding the bushing 62 and the serrated plate 68 is a mounting bracket 74 secured to the cover plate 16 by a butt weld. A projection 78 in the undersurface of the bracket 74 and a complementary recess 80 in the cover plate serve to locate the bracket 74 during welding thereof. The bracket 74 has its main portion 82 circular with a cutout center portion having a circular edge 84 concentric with the outside configuration of the main portion 82 for receiving therein the bushing 62 and the plate 68. Branching out from the main portion 82 are two diametrically opposed tongues 86, 88 which are located in a plane offset from that of the main portion 82. In the angled portion 89 of the tongue 86, a recess 90 is formed to receive a fulcrum lip 92 projecting from the U-shaped clamping plate 94. A screw 76 extends through an aperture 96 in the plate 94, passing freely through an aperture 98 in the mounting bracket 74 and is threadedly secured in a tapped bore 100 in the cover plate 16. The legs 102 of the plate 94 engage the upper surface of the plate 68 with the lip 92 being firmly anchored against rotation in the recess 90 and serves as a clamp for the plate 68 when the screw 76 is driven inwardly of the casing 10.

Figure 3:
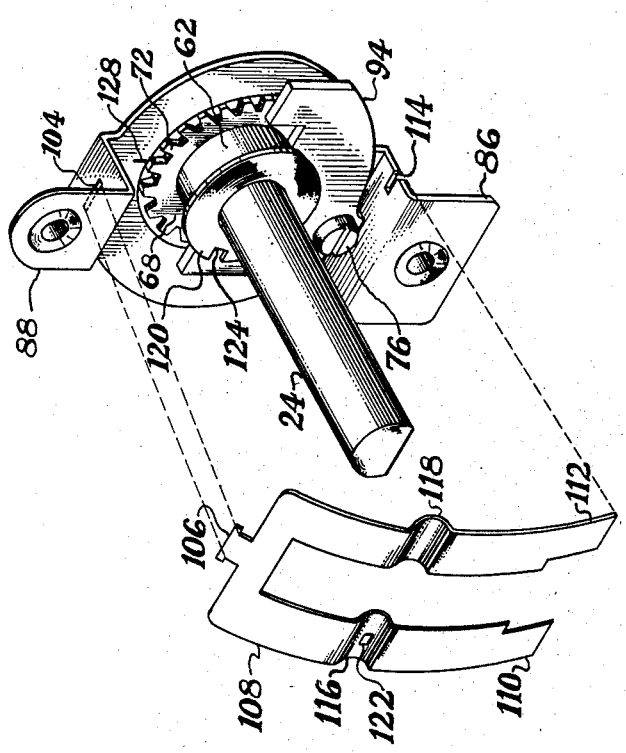
Fig. 3 is a perspective view of a detail of the invention.

At the other end of the mounting bracket 74, the angled portion 103 of the tongue 88 has a slot 104 for receiving a T-shaped tongue 106 integral with one end of a two-legged bow type spring 108. The legs 110, 112 of the bow spring 108 are held in position at the remote end of the mounting bracket 74 by cutouts 114 in the angled portion 89 of the tongue 86. As shown in Figs. 1 and 3, each of the legs 110, 112 have at their respective midpoints curved humps 116, 118 which frictionally engage a stop plate 120 lying in face-to-face abutment with the top surface of the bushing 62 and serve as a means for holding the plate 120 against accidental rotation. The stop plate 120 is formed with a D-shaped center opening which receives the complementary portion of the shaft 24 being cooperable therewith to rotate with the same. In its assembled position, the bow spring 108 is tensioned so as to provide a force on the stop plate 120 to hold the same against the bushing 62 and cooperate with the clamp 94 for preventing displacement of the bushing 62 with respect to the cover plate 16 in the event that the clamping screw 76 is loosened for adjustment purposes.

As shown in Fig. 3, the hump 116 is provided with a projection 122 for engagement with a detent 124 in the washer-like stop plate 120 when the plate 120 has been rotated to bring the projection 122 and the detent 124 into coincidence. Because of the resiliency of the leg 110 of the bow spring 108, the projection 122 is biased into the detent 124 and the coaction between them locks the plate 120 firmly into position when in coincidence and more force is required to rotate the shaft 24 to dislodge them than is necessary to overcome the friction between the bow spring 108 and the top surface of the plate 120. A rectangular tongue 126 is made integral at the peripheral edge of the plate 120 and is designed to abut the screw 76 when the shaft 24 and consequently the plate 120 has been rotated to the limits of its range. It is to be noted that the position of the plate 120 when the tongue 126 is in abutment with the shaft 24 is such that the detent 124 is in register with the projection 122. This is the "off" position for the shaft 24 and a dial or knob (not shown) would be set to register "off" with respect to a temperature indicating card (not shown). Once the projection 122 has been dislodged from its seat in the detent 124, a lighter force is needed to rotate the shaft 24 to any position within its range of rotation, and the resiliency of the legs 110, 112 is sufficient to hold the shaft 24 in a desired position.

In the operation of the present invention, it is assumed that the temperature setting shaft 24 and its related knob or dial (not shown) is in such position that the desired indicated temperature does not correspond to the actual controlled temperature, and therefore calibration and adjustment of the control knob with respect to the thermostat is required. Assuming that the shaft 24 is turned to the "off" position so that the projection 122 is seated in its respective detent 124 and the tongue 126 abuts the shank of the screw 76, the screw 76 is rotated to unloosen the clamping plate 94 thereby releasing the frictional engagement between the legs 102 of the clamping plate 94 and the top surface of the plate 68. Correction of the temperature setting means is accomplished by the axial repositioning of the adjusting screw 56 with respect to the bushing 62 so that the effect of the diaphragm element on the snap action mechanism will be changed for a particular position of the temperature setting shaft 24.

The present invention provides teeth or marks and slot means for gradual rotation of the bushing 62 and plate 68; said rotation being in one or the other direction according to whether the temperature correction is to be increased or decreased. To this end, the bushing 62 is rotated to effect axial displacement of the shaft 24 and the corrected positioning of the diaphragm button 26 with respect to the condition at which the snap action mechanism is set to operate.

It will be apparent that the rotation of the bushing 62 may be accomplished without the initial positioning of the shaft 24 to the "off" position and the abutment of the tongue 124 with the screw 76, as previously described. In the alternative, the shaft 24 may be set at any position and the screw 76 loosened so as to free the legs 102 of the plate 94 from its frictional engagement with the bushing 62.

From the construction outlined above, it will be apparent that to rotate the plate 68 in angular increment fashion, thereby imparting rotative motion to the bushing 62, a flat pointed tool such as a screw driver may be inserted in one of the notches 70 of the plate 68 and moved transversely left or right of the cover plate 16 as viewed in Fig. 1. A reference mark 128 is provided on the periphery of the central cutout 86 to serve as a guide for accurate alignment with a tooth 72, a notch 70 or any portion thereof.

As previously indicated the toothed spacing of the plate 68 is uniform and any number of teeth may be provided. The teeth 72 are so spaced and the pitch of the threads on the adjusting screw 56 and the bushing 62 so designed that the rotation of the plate 68 caused by the displacement of one tooth space will correct the temperature setting shaft 24 five degrees. It will be apparent that any number of teeth may be provided and any degree of correction attributed to a tooth spacing without departing from the scope of the invention.

In adjusting a thermostat, the operator need only determine the differential in degrees of temperature between the indicated temperature setting and the actual controlled temperature, and by manipulating a suitable tool, rotate the serrated plate 68 in the proper direction and for the proper number of teeth spaces to effect total elimination of the differential of error. When the bushing 62 has been rotated to effect a proper calibration of the thermostat, the screw 76 is screwed into the casing 10 to force the legs 102 of the clamping plate 94 against the plate 68 and the bushing 62 thereby securing the same to the casing 10.

The type of control shaft construction and the mounting of the calibration adjustment means, as outlined above, provides numerous advantages: the complete calibration adjustment means comprises a total of but nine parts; adjustment may be readily made with the use of only a small screw driver without the need of removing any parts except the knob or dial; and the adjustment can be made quickly and accurately while all the parts are in their assembled position.

It will also be apparent to those skilled in the art that the illustrated embodiment of this invention may be variously changed and modified, or features thereof, singly or collectively, embodied in other combinations than that illustrated without departing from the scope of the invention, and that accordingly the disclosure herein is illustrative only and the invention is not limited thereto.

I claim:

1. A regulator for a variable condition, comprising a casing having an apertured wall, control means movable between controlling positions in said casing, condition responsive means operatively associated with said control means for movement thereof in response to variations in a variable condition, adjusting means having a threaded portion projecting through said apertured wall and being operatively engageable with said condition responsive means, means for rotating said adjusting means, means for mounting said threaded portion on said casing wall for axial movement of said adjusting means relative to said condition responsive means upon operation of said rotating means, said mounting means including an annular flange abutting said casing wall, a holding plate overlying said flange, securing means extending through said plate and said casing wall for releasably clamping said mounting means in abutting relation therewith, and means carried by said mounting means and operable upon release of said securing means for rotating said mounting means in either direction relative to said plate and said casing and causing said axial movement of said adjusting means to a predetermined position, said securing means being operable for reclamping said mounting means in said abutting relation to said casing wall following said rotating movement while said adjusting means remains in said position.

2. A regulator for a variable condition comprising a casing having an apertured wall, control means movable between controlling positions in said casing, condition responsive means operatively associated with said control means for movement thereof in response to variations in a variable condition, adjusting means having a threaded portion projecting through said apertured wall and operatively engageable with said condition responsive means, means for rotating said adjusting means, means for mounting said threaded portion on said casing wall for axial movement of said adjusting means relative to said condition responsive means upon operation of said rotating means, said mounting means including an annular flange abutting said casing wall, clamping means releasably engaging said flange and extending into said casing wall for clamping said mounting means in abutting relation therewith, detent means carried by said mounting means and operable upon release of said clamping means for rotating said mounting means in either direction relative to said clamping means and said casing and causing said axial movement of said adjusting means to a predetermined position, said clamping means being operable for reclamping said mounting means in said abutting relation to said casing wall following said rotating movement while said adjusting means remains in said position, and stop means fixed to said adjusting means and supported by said mounting means for cooperation with said clamping means to limit rotation of said adjusting means.

3. A regulator for a variable condition as claimed in claim 2 wherein said adjusting means is provided with a non-circular cross-section shaft, said stop means comprising a plate having a complemental non-circular aperture, and a U-shaped spring member mounted on said casing and having a pair of legs operatively engaging said plate on either side of said shaft for yieldably retaining said plate in engagement with said mounting means.

4. A regulator for a variable condition as claimed in claim 3 wherein said detent means comprises a flange element having a peripherally notched portion accessible from the exterior of said casing between the legs of said spring member.

References Cited in the file of this patent

UNITED STATES PATENTS

| | | |
|---|---|---|
| 1,900,520 | Pickup | Mar. 7, 1933 |
| 1,974,680 | Mackintosh | Sept. 25, 1934 |
| 2,066,821 | Brumbaugh | Jan. 5, 1937 |
| 2,150,411 | Andersson | Mar. 14, 1939 |
| 2,182,315 | Hart | Dec. 5, 1939 |
| 2,303,011 | Weber | Nov. 24, 1942 |

FOREIGN PATENTS

| | | |
|---|---|---|
| 432,909 | Great Britain | Aug. 6, 1935 |